United States Patent [19]

Demers et al.

[11] 4,437,490

[45] Mar. 20, 1984

[54] REED VALVE ASSEMBLY

[75] Inventors: Robert J. Demers; Rick Schilbe, both of London, Canada

[73] Assignee: Webster Air Equipment Ltd., London, Canada

[21] Appl. No.: 306,947

[22] Filed: Sep. 30, 1981

[30] Foreign Application Priority Data

Jul. 6, 1981 [CA] Canada .................................. 381132

[51] Int. Cl.³ .............................................. F16K 15/14
[52] U.S. Cl. ................................. 137/512.4; 137/854; 417/560
[58] Field of Search ............. 137/493.8, 512.15, 512.4, 137/854–858; 417/560

[56] References Cited

U.S. PATENT DOCUMENTS

| 1,416,771 | 5/1922 | Babson | 137/855 X |
| 1,633,772 | 6/1927 | Clapp | 137/512.4 |
| 1,748,531 | 2/1930 | Troup | 137/854 X |
| 3,165,067 | 1/1965 | Greenwald | 137/512.4 X |
| 4,164,238 | 8/1979 | Riedel | 137/855 X |

FOREIGN PATENT DOCUMENTS 157671  8/1952  Australia ........................ 137/512.15

Primary Examiner—Robert G. Nilson
Attorney, Agent, or Firm—Stephen A. Roen; Arthur L. Frederick

[57] ABSTRACT

A reed valve assembly is provided with a reed sandwiched between two base members, e.g. a valve plate and a cylinder head of a compressor. The reed is clamped between the two members at a central part whereby both free ends of the reed can flex. The base members are so structured that one free end of the reed forms an intake valve members and the other a discharge valve member, whereby a single reed serves both as an intake valve member and as a discharge valve member. The invention also avoids rivets or the like elements by securing the reed to the base solely by the clamping action of properly recessed faces of the two base members.

2 Claims, 8 Drawing Figures

REED VALVE ASSEMBLY

The present invention relates to a reed valve assembly.

Reed valves are widely used in the compressed gas industry where a reliable, lightweight, quick acting and inexpensive type of valve is required, especially in the light to medium duty reciprocating piston gas compressor application. They are mainly used in average speed reciprocating compressors of up to 1500-2000 RPM, in which range they perform well. Their function is to regulate intake and discharge port openings in alternative fashion where each port requires a separate valve. Some designs service double ported intake or discharge. In most cases they are made of thin resilient metal leaves and are normally held in place in a cantilever fashion, by either rivets, or small screws, or by suitable clamping means. Typically, a valve plate is attached to the compressor cylinder block and has intake and discharge ports to the cylinder. The intake valve is mounted on the underside of the valve plate while the discharge valve is located on the top surface of the valve plate. Some valve attachments are very simple and inexpensive, other have complicated backup parts and are expensive to manufacture.

The known valve arrangements wherein the discharge and the intake valves are disposed one beside the other have thus far been served by two separate reeds, a relatively complex and expensive arrangement, even though the serving of, say, two discharge ports had been proposed long ago, as shown for instance in U.S. Pat. No. 1,555,197 issued Sept. 29, 1925 to J. H. Dennedy.

It is an object of the present invention to provide a reed valve assembly which would further advance the art by providing structural simplicity and which would also improve the way of securement of the reed member to the plate or base member.

Broadly, the present invention can be defined as a reed valve arrangement, comprising, in combination: a base formed by two rigid members between which the intermediate portion of the reed is sandwiched, one of said rigid members having said downstream facing seat of said intake port, the other of said rigid members having said downstream facing seat of said discharge port.

More specifically, but still defining the invention in broad terms, the present invention provides a reed valve assembly comprising, in combination: a first base member having an exterior face and an interior face; a second base member having an exterior surface and an interior face; mounting means for mounting said base members with their interior faces mating with each other; an elongated reed having a flat intermediate portion clamped between said interior faces, a first free end section and a second free end section; said fist base member having a first recess complementary with the contour of said first free end section of the reed to allow free flexing thereof into and out of the first recess and to allow the passage of a fluid through the first recess when the first free end section is flexed into same; and an inlet passage complementary with and overlapped by said second free end section of the reed; said second base member having a second recess complementary with the contour of said second free end section of the reed to allow free flexing thereof into and out of the second recess and to allow the passage of a fluid through the second recess when the second free end section is flexed into same; and an inlet passage complementary with and overlapped by said first free end section of the reed; and each of said first and second recesses communicating with first outlet opening means and second outlet opening means, respectively, whereby each respective recess and the respective outlet opening means form a passage through the respective base member.

The present invention thus provides an improvement whereby a single reed is utilized, at one free end thereof, as an intake valve member, while the other free end of the reed serves as a discharge valve member. The arrangement thus simplifies the structure of the reed valve assembly, serving both the intake and discharge of a compressor or the like.

The invention will now be described by way of a diagrammatic explanatory embodiment and by way of application in a compressor, with reference to the accompanying drawings.

IN THE DRAWINGS

Figure 5:
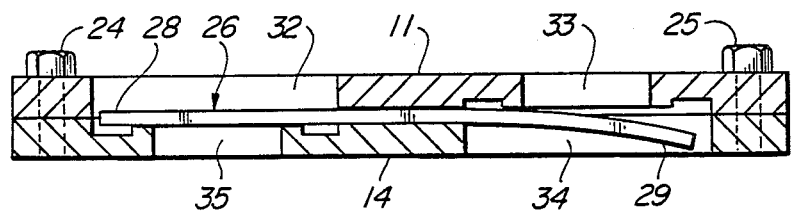
FIG. 5 is a sectional view similar to that of FIGS. 2 or 3 but showing the elements in an assembled state, with the intake port open.
Figure 6:
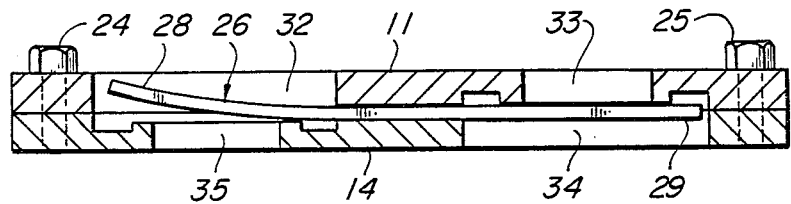
FIG. 6 is a sectional view similar to that of FIG. 5 but showing the discharge valve open.

The explanatory arrangement as shown in FIGS. 1–6 comprises a first base member 10 of a rectangular configuration and having an exterior face 11 and an interior face 12. With particular reference to FIGS. 5 and 6, it will be observed that the interior face 12 is that face of the base member 10 which is turned towards the second base member 13. In the diagrammatic representation, the second base member 13 is shown as being of an identical structure with the first base member 10. It is to be appreciated, however, that the generally identical structure of base members 10, 13 is only critical with respect to certain parts thereof at their interior faces. The second base member 13 also has an exterior face 14 and an interior face 15.

Each of the base members 10, 13, is provided, at the respective corners, with a mounting bore, the mounting bores of the base member 10 being marked with reference numerals 16, 17, 18 and 19, while the corresponding bores of the second base member 13 are referred to with reference numerals 20, 21, 22 and 23.

FIGS. 5 and 6 show that in an assembled state, each pair of bores 16–20; 17–21; 18–22 and 19–23 receives a respective bolt such as bolt 24, 25 shown in FIGS. 5 and 6, passing through the pairs of bores 16–20 and 17–21, respectively. The bores as described above present an element which can be generally referred to as "mounting means for mounting the base members with their interior faces mating each other", it being understood that the particular arrangement of these "mounting means" depends on the desired application of the invention.

Figure 1:
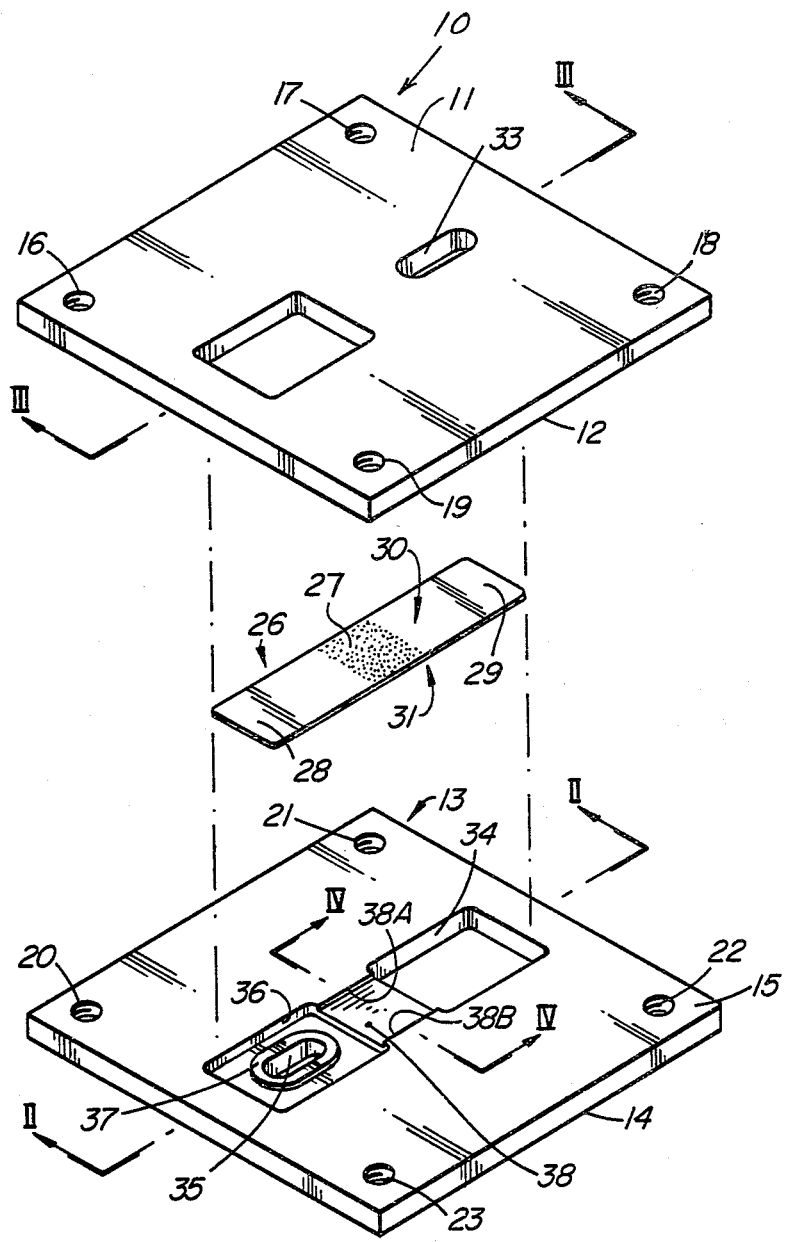
FIG. 1 is a diagrammatic exploded view of a valve assembly showing only basic elements of the present invention, solely for the purpose of explaining the principle of operation of the invention.
Figure 3:
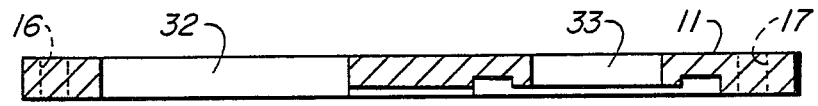
FIG. 3 is section III—III of the upper plate of FIG. 1.
Figure 2:
FIG. 2 is section II—II of the lower plate of FIG. 1.
Figure 4:
FIG. 4 is section IV—IV of FIG. 1.

FIG. 1 further shows an elongated reed 26. As is well known in the art, the reed 26 is made of thin, normally flat, single thickness, springy sheet material. The reed 26 is, for convenience, marked as having a flat, intermediate portion 27 and two free end portions 28, 29, the free end portions 28, 29 being arranged to bear against the respective ports, as will be described later. With reference to the embodiment shown in FIG. 1, the reed 26 also has a first face 30 which is turned towards the first base member 10 and a second face 31 which faces the second base member 13.

The first base member is provided, at its interior face, with a rectangular recess or first opening 32 and with an oval or first inlet passage 33. The interior face of the second base member 13 is of generally identical structure. It has a rectangular recess or second opening 34 and an oval or second inlet passage 35. The passage 35 of the second base member 13 (and also the passage 33 of the first base member 10) is disposed within a shallow depression 36 in the interior face 15 of the member 13. The oval passage 35 is surrounded by a rim 37 protruding slightly above the bottom of the flat shallow depression 36. The surface of the rim 37 is coplanar with a flat intermediate section 38, also referred to as "a central depression" defining side walls 38A, 38B which is also slightly depressed with respect to the rest of the planar surface of the interior face 15 and is complementary with the intermediate portion 27 of the reed 26. The size of the rectangular recess 34 is sufficient to allow free flexing of the free end portion 29 in a direction away from the rim (not shown) of the oval passage 33, which is of a structure identical with that of the rim 37. Similarly, the rectangular recess 32 is of a size sufficient to allow a similar corresponding free flexing of the free end portion 28 of the reed 26 in a direction away from the oval passage 35 and of the rim 37 thereof. On the other hand, the size of the oval opening 35 with respect to the rectangular configuration of the free end portion 28 is such that the free end portion 28 fully covers the rim 37 and thus the opening or passage 35. The opposite free end portion 29 is effective in a similar manner in covering the oval passage 33 of the first base member 10.

Figure 8:
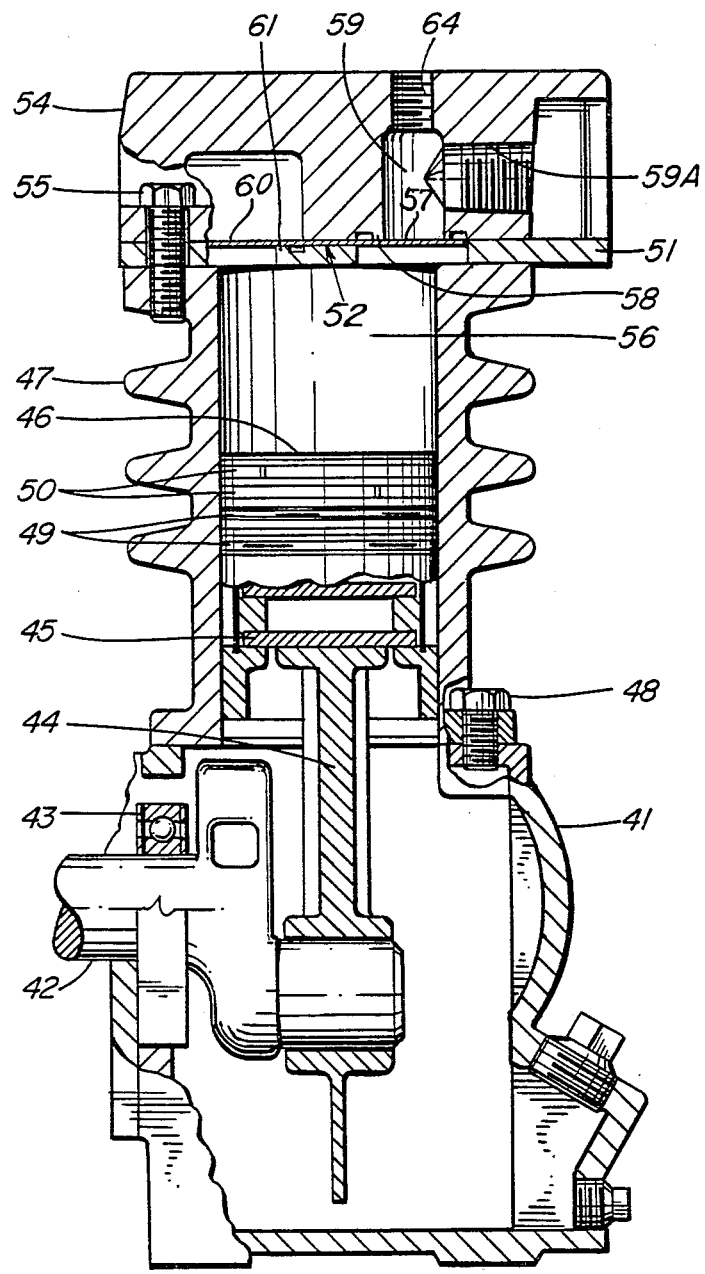
FIG. 8 is a sectional view of a compressor including the elements of FIG. 7 in assembled form.

Referring briefly to the overall arrangement of an actual embodiment of the present invention as applied to a compressor, as shown in FIG. 8 and then turning back to the functional diagrammatic representation of FIGS. 5 and 6, it will be observed that on an assumption that the exterior face 14 of the assembled valve is subjected to vacuum, the exterior atmospheric pressure results in resilient deflection of the free end portion 29 away from the rim or seat of the oval passage 33. The free end 29 is now within the rectangular recess 34 (FIG. 5) thus allowing passage of a fluid, air or the like, through the intake oval passage 33 and through the rectangular recess 34 to an associated apparatus, for instance, a compressor. By the same token, the vacuum acting at the exterior face 14 maintains a tight engagement between the free end portion 28 and the seat or rim 37 which, in combination with the flexibility of the reed 26, results in the discharge oval passage 35 now being closed.

On the other hand, when the exterior face 14 is subjected to a pressure (for instance by the action of a compressor piston as shown in FIG. 8), the free end portion 29 is pressed against its seat surrounding the intake oval passage 33 while the generated pressure overcomes the resiliency of the reed 26 at its free end portion 28 which is now deflected into the recess 32 through which the gas or the like can be discharged.

The diagrammatic representation of FIGS. 1-6 thus shows that the present invention requires only one reed 26 to serve both the intake and the discharge function of a machine. Furthermore, since the reed 26 is "sandwiched" between the base members 10, 13, the clamping force exerted by the anchor bolts such as bolts 24, 25, in combination with the shallow recessed intermediate portion 38 in one or both of the members 10, 13, maintains the reed 26 in position without the need for weakening the same by a hole for a rivet, a screw or the like commonly used in securement of reeds to base members such as member 10 or 13.

Figure 7:
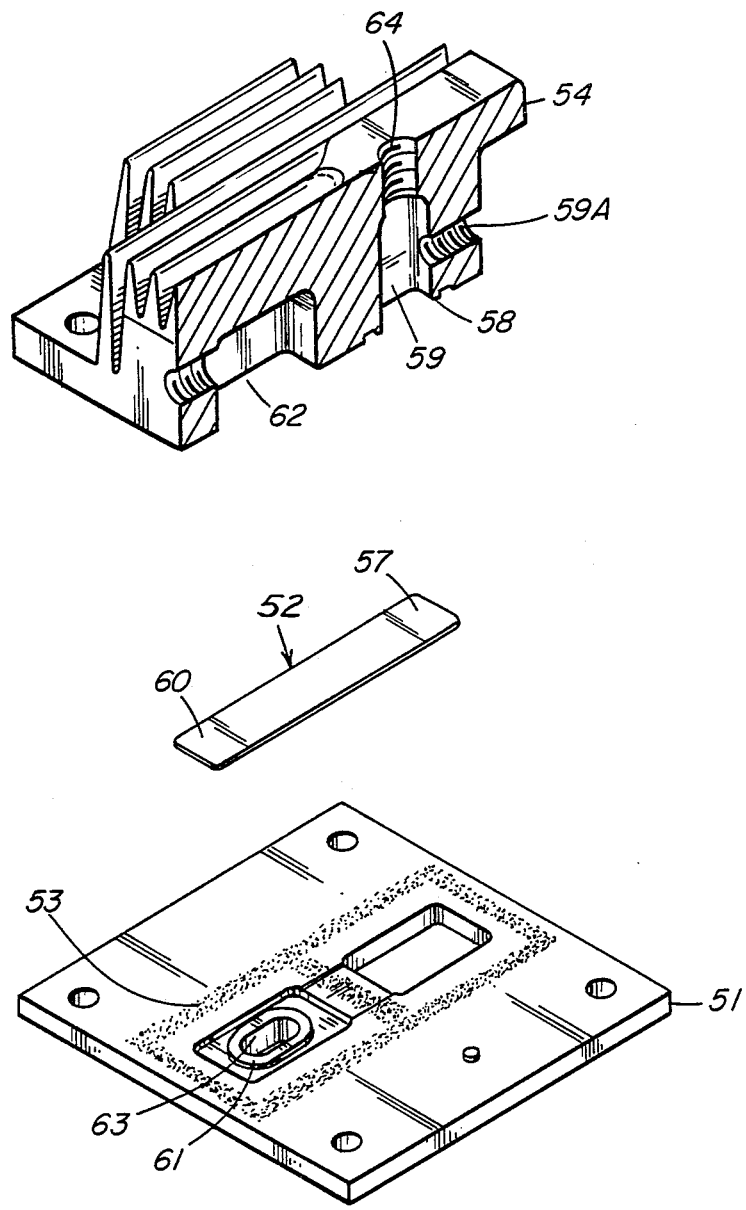
FIG. 7 is a simplified exploded isometric view, partly in section, similar to that of FIG. 1 but showing a concrete application of the invention in a compressor.

The invention will now be described in greater detail with reference to FIGS. 7 and 8 showing the application of the invention in a gas compressor.

Referring particularly to FIG. 8, the gas compressor consists of a crankcase 41 in which the crankshaft 42, equipped with ball bearing 43 is mounted for rotation. A connecting rod 44 having a bearing on the crankshaft 42 is connected at the upper end, through a wrist pin 45 to a piston 46 mounted in a cylinder block 47 which is secured to the crankcase 41 by bolts 48 and, as is usual in the art, is equipped with oil rings 49 and with compression rings 50. A valve plate 51 sits on top of the cylinder block 47. A gasket is used to seal the valve plate 51 to the cylinder block 47. A reed 52 is positioned in place on the valve plate 51 which is coated with a suitable industrial compound form-in-place tight gasket as indicated at 53 in FIG. 7. A cylinder head 54 is mounted on top of the valve plate 51 and reed 52 and is secured to the cylinder block 47 by bolts 55.

On its downward stroke, the piston 46 tends to create a vacuum in the cylinder chamber 56 which causes a portion of the reed 52 at its free end 57 to flex down from its rim or seat 58 and let air (or other gases) be drawn in from an intake chamber 59 which may be operatively associated with an air filter (not shown) or with a remote intake connected to a threaded hole 59A.

It will be readily appreciated that the function described in the preceding paragraph corresponds to what is shown in the diagrammatic section of FIG. 5. By the same token, it will be seen that in the actual embodiment of the present invention, as shown in FIG. 7 and FIG. 8, the "first base member" as referred to diagrammatically in FIGS. 1-6 forms a part of the cylinder head 54 referred to in FIGS. 7 and 8.

On its upward stroke, the piston 46 compresses air (or other gases) which causes the free end portion 60 of the reed 52 to lift from the seat 61 when the pressure inside the cylinder chamber gets greater than the pressure inside a discharge chamber 62. Compressed air (or other gases) then escapes through the discharge port 63 and through the discharge chamber 62 to an air receiver or the like device (not shown). A threaded passage 64 serves for the purpose of mounting an unloader valve, if required. The unloader valve does not form any part of the present invention. From the standpoint of operation of the valve assembly of the present invention, the passage 64 may be considered as being closed.

Those skilled in the art will readily appreciate that further modifications may exist of the present invention, which depart from the embodiment described above, without departing from the spirit and scope of the present invention.

What is claimed is:

1. A reed valve assembly comprising, in combination:
   (a) a first base member having an exterior surface and an interior face;
   (b) a second base member having an exterior surface and an interior face;
   (c) mounting means for securing said first and second base members together with their respective interior faces abutting each other;
   (d) at least one elongated reed having a flat intermediate portion disposed between a first free portion and a second free portion;
   (e) a central depression in the exterior face of at least one of said first and second base members for receiving said flat intermediate portion of said reed and clamping said intermediate portion between the interior faces of the first and second base members;
   (f) said first base member having a first recess complementary with the contour of said first free end portion of the reed to allow free flexure thereof into and out of the first recess and to allow the passage of a fluid through the first recess when the first free end portion is flexed into same and having a first inlet passage overlapped by said second free end portion of the reed;
   (g) said second base member having a second recess complementary with the contour of said second free end portion of the reed to allow flexure thereof into and out of the second recess and to allow the passage of a fluid through the second recess when the second free end portion is flexed into same and having a second inlet passage overlapped by said first free end portion of the reed;
   (h) each of said first and second recesses communicate respectively with a first outlet opening means and second outlet opening means, whereby each associated recess and outlet opening means form a passage through the respective base members;
   (i) each of said first and second inlet passages of each of the first and second base members is disposed in the bottom of an associated depression having a depth greater than that of said central depression, and
   (j) a valve seat projecting from the bottom of each of the inlet passage depressions and having a distal seating surface against which the associated first and second free end portion of the reed abuts to prevent flow of fluid through the associated first and second inlet passages.

2. A valve assembly as claimed in claim 1, wherein said intermediate port of the reed has two opposite sides and is disposed within juxtaposed central depressions in the interior faces of each base member, each depression including two opposite side walls closely spaced from the opposite sides of the intermediate portion of the reed so that the side walls coact with the clamping action of the base members to secure the reed to the first and second base members.

* * * * *